US008223409B2

(12) United States Patent
Sugiyama et al.

(10) Patent No.: US 8,223,409 B2
(45) Date of Patent: Jul. 17, 2012

(54) OPTICAL DEVICE, IMAGE READING APPARATUS AND ADJUSTING METHOD FOR OPTICAL DEVICE

(75) Inventors: Namie Sugiyama, Kakegawa (JP); Keisuke Hatomi, Tokyo (JP); Kohshi Takano, Tokyo (JP); Satoshi Komatsu, Tokyo (JP)

(73) Assignees: NEC Access Technica, Ltd., Kakegawa-shi (JP); NEC Engineering, Ltd., Tokyo (JP)

( * ) Notice: Subject to any disclaimer, the term of this patent is extended or adjusted under 35 U.S.C. 154(b) by 557 days.

(21) Appl. No.: 12/463,813

(22) Filed: May 11, 2009

(65) Prior Publication Data
US 2009/0279157 A1 Nov. 12, 2009

(30) Foreign Application Priority Data
May 12, 2008 (JP) .................................. 2008-125094

(51) Int. Cl.
G02B 26/08 (2006.01)
H04N 1/40 (2006.01)
H04N 1/04 (2006.01)

(52) U.S. Cl. ........ 358/497; 358/471; 358/474; 358/475; 359/224.1; 359/221.2

(58) Field of Classification Search .................. 358/474, 358/471, 476, 497; 359/223.1, 224.1, 221.2; 356/394
See application file for complete search history.

(56) References Cited

U.S. PATENT DOCUMENTS

| 5,159,484 A | 10/1992 | Yanagisawa | |
|---|---|---|---|
| 7,095,535 B2 * | 8/2006 | Ogata | 358/475 |
| 7,411,705 B2 * | 8/2008 | Huang et al. | 358/475 |

FOREIGN PATENT DOCUMENTS

| JP | 02-253274 | 10/1990 |
|---|---|---|
| JP | 04-257815 | 9/1992 |
| JP | 7-319077 | 12/1995 |
| JP | 07-319077 | 12/1995 |
| JP | 2005-309301 | 11/2005 |

OTHER PUBLICATIONS

Japanese Patent Office issued a Japanese Office Action dated May 11, 2010, Application No. 2008-125094.
Chinese Official Action—200910141613.6—Jun. 24, 2011.

* cited by examiner

Primary Examiner — Charlotte M Baker
Assistant Examiner — Rury Grisham
(74) Attorney, Agent, or Firm — Young & Thompson

(57) ABSTRACT

An optical device equipped with a mirror which reflects light, include a plurality of first receiving parts that touch one face of one of ends in a lengthwise direction of the mirror; a plurality of first pressing parts that touch a face opposing to the face to which the first receiving parts touch, and press the mirror with elastic force toward the first receiving parts.

14 Claims, 21 Drawing Sheets

OPTICAL DEVICE, IMAGE READING APPARATUS AND ADJUSTING METHOD FOR OPTICAL DEVICE

This application is based upon and claims the benefit of priority from Japanese Patent Application No. 2008-125094, filed on May 5, 2008, the disclosure of which is incorporated herein in its entirety by reference.

TECHNICAL FIELD

The present invention relates to an optical device, an image reading apparatus and an adjusting method for an optical device.

BACKGROUND ART

In recent years, regarding an image reading apparatus such as a copying machine, a facsimile machine and a scanner, research and development of a product corresponding to colorization and a product with higher-resolution are progressing. As an outcome of such research and development, various high-performance products are being provided to the market.

An image reading apparatus reads image information for each of three primary colors, that is, red, green and blue. Then, color image information is created by overlapping the image information of each read primary color by a pixel unit.

The image reading apparatus reads image information, such as not only a sheet shaped manuscript but a book with a certain degree thickness are read.

For example, Japanese Patent Application Laid-Open No. 1995-319077 discloses an image reading apparatus equipped with an optical device which reads the image information by a linear image sensor scanning a manuscript placed on the platen glass.

This optical device includes an optical lens and a mirror and the like in addition to the linear image sensor, and is arranged in a position under the platen glass. Rails which guide the optical device are also arranged under the platen glass. And the optical device is reciprocated on the rails when the manuscript reads.

At that time, the mirror of the optical device may vibrate by vibration which occurs by friction between the optical device and the rails. The vibration of the mirror may shift a path of light which enters the linear image sensor.

On the other hand, Japanese Patent Application Laid-Open No. 2005-309301 discloses technology which suppresses vibration of a mirror by holding an edge or the like of the mirror. However, Japanese Patent Application Laid-Open No. 2005-309301 does not disclose by what kind of a method, a construction and a force the edge or the like of the mirror is held.

SUMMARY

An exemplary object of the present invention is to provide an optical device, an image reading apparatus and an adjusting method for an optical device in which vibration of a mirror is suppressed.

An optical device equipped with a mirror which reflects light, include a plurality of first receiving parts that touch one face of one of ends in a lengthwise direction of the mirror; a plurality of first pressing parts that touch a face opposing to the face to which the first receiving parts touch, and press the mirror with elastic force toward the first receiving parts.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

A consideration of the related art precedes explanation of a first exemplary embodiment of the present invention.

Figure 15A:
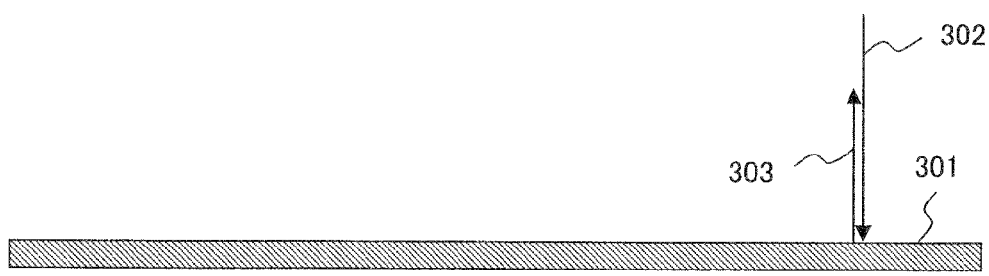
FIG. 15A is a diagram illustrating of optical path change in reflected light when a mirror is not vibrating in consideration of a related art.
Figure 15B:
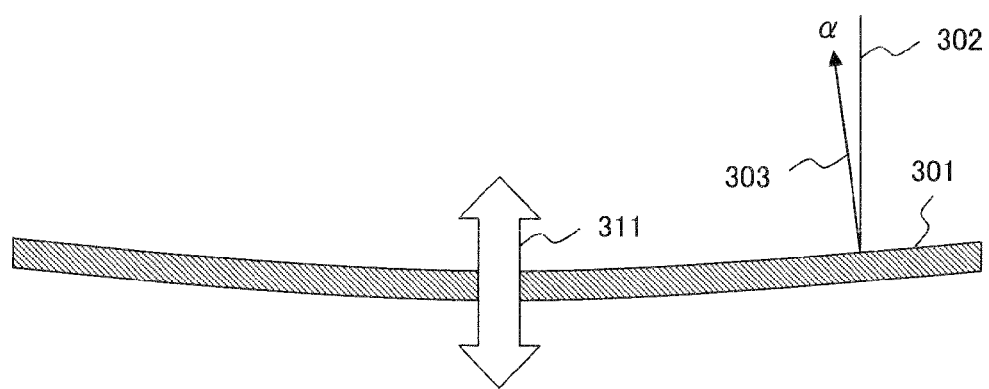
FIG. 15B is a diagram illustrating an optical path change in reflected light when the mirror is vibrating in considering of a related art.

FIG. 15A and FIG. 15B are diagrams illustrating an optical path change of reflected light by vibration of a mirror. FIG. 15A is a diagram illustrating the optical path change of reflected light when the mirror 301 is not vibrating. The optical path of reflected light 303 is the same optical path as that of an incident light when incident light 302 enters vertically to the mirror 301.

In contrast, FIG. 15B is a diagram illustrating optical path change of reflected light when vibration in the direction of arrow 311 occurs in a central part of the mirror 301.

As shown in FIG. 15B, the mirror 301 in a curved state can be regarded as the mirror which inclined at an angle corresponding to a curved quantity in areas of left and right ends. In this case, the reflected light 303 has the optical path which inclines in the direction approaching the central part of the mirror 301 by angle α to the optical path of the incident light 302.

On the other hand, when the central part of the mirror 301 is curved to the upper side in FIG. 15B, the reflected light 303 has the optical path which inclines in the direction getting away from the central part of the mirror 301 by angle α to the optical path of the incident light 302.

Meanwhile, the optical path length between a manuscript and an optical lens needs to be long to some extent. Then, in general, several mirrors are used in the optical device. Because the reflected light from the manuscript is reflected several times by several mirrors, optical path length becomes long.

However, when the several mirrors vibrate in directions which are different respectively, because the optical path of reflected light also changes, image information read by a linear image sensor includes jitter and thus image quality declines.

Figure 16:
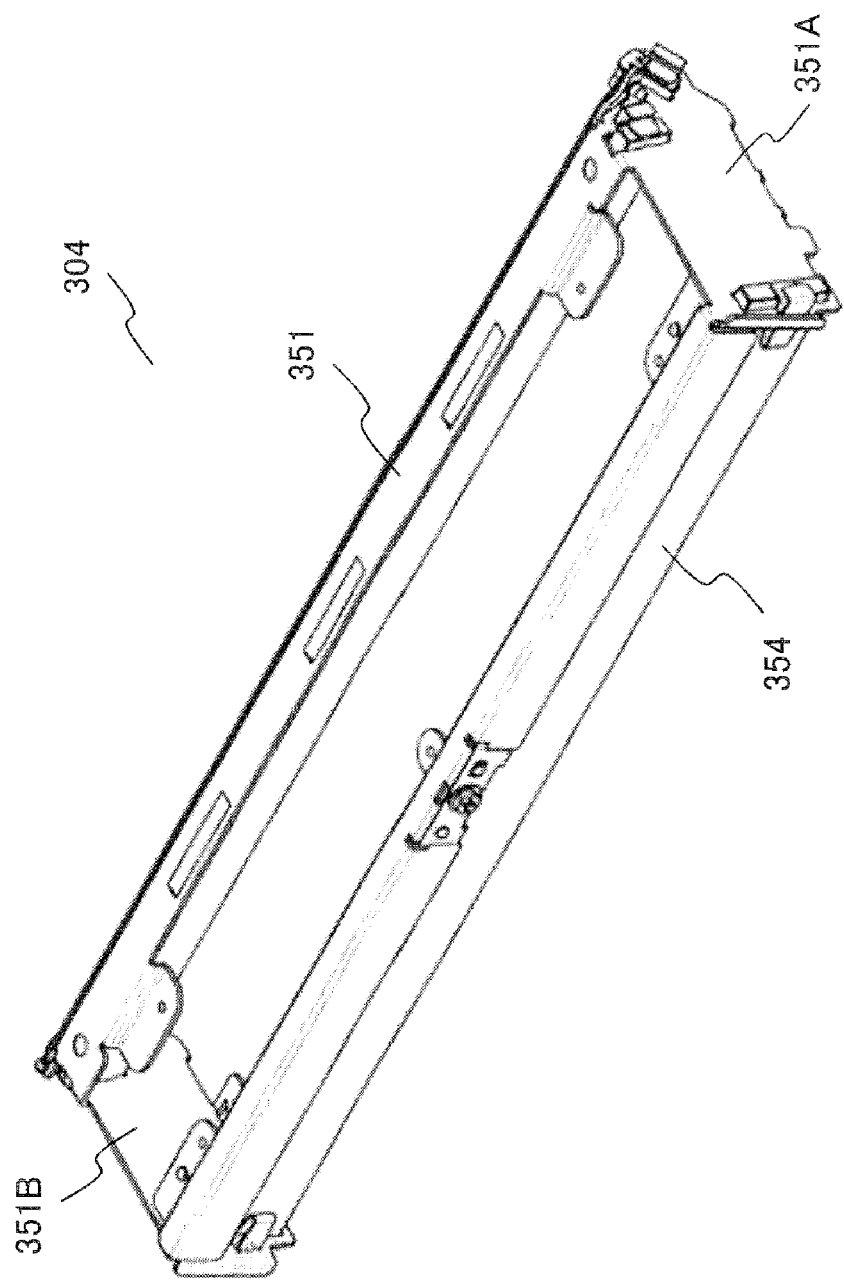
FIG. 16 is a perspective view of the optical device of related art in which vibration of the mirror may be suppressed.
Figure 17:
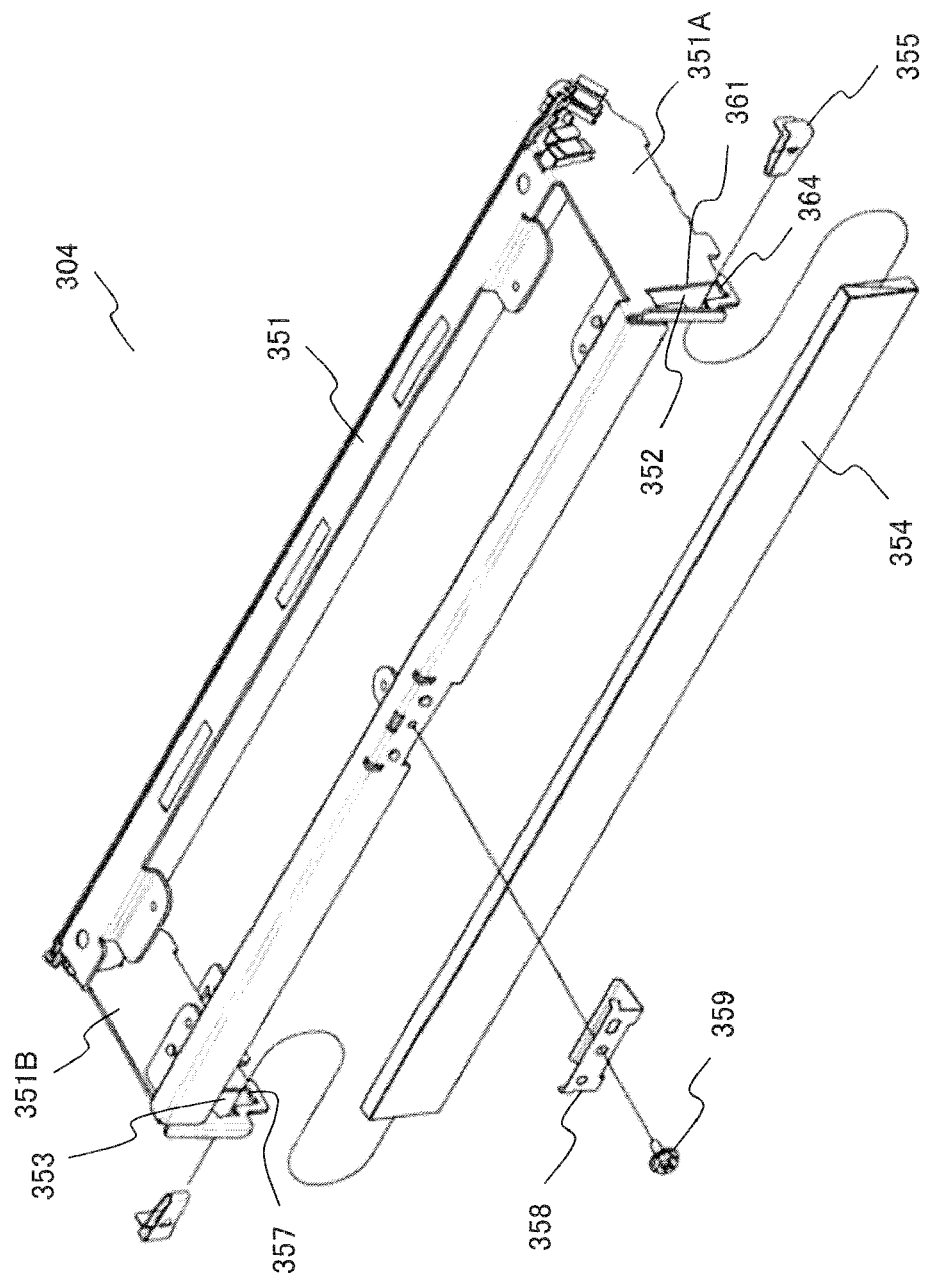
FIG. 17 is an exploded perspective view of the optical device shown in FIG. 16.

Accordingly, a proposition to suppress vibration of the mirror has been made. FIG. 16 is a perspective view showing main portions of the optical device according to related art which suppresses such vibration of the mirror. FIG. 17 is an exploded perspective view showing a state when installing the mirror in this optical device.

As shown in FIG. 17, oblong openings 352 and 353 are provided in both side plates 351A and 351B of a frame 351 in the optical device 304. Both ends of an elongated mirror 354 are inserted in these openings 352, 353 respectively. Leaf springs 355 and 356 for mirror fixing are pressed in between the mirror 354 and the openings 352 and 353. The Leaf springs 355 and 356 for mirror fixing have projecting portions 355A and 356A for fixing the mirror 354.

A damping spring 358 is fixed by a screw 359 on the central part of the frame 351. By an elastic force of the damping spring 358, the central part of the mirror 354 is pressed toward the direction of the frame 351.

Figure 18:
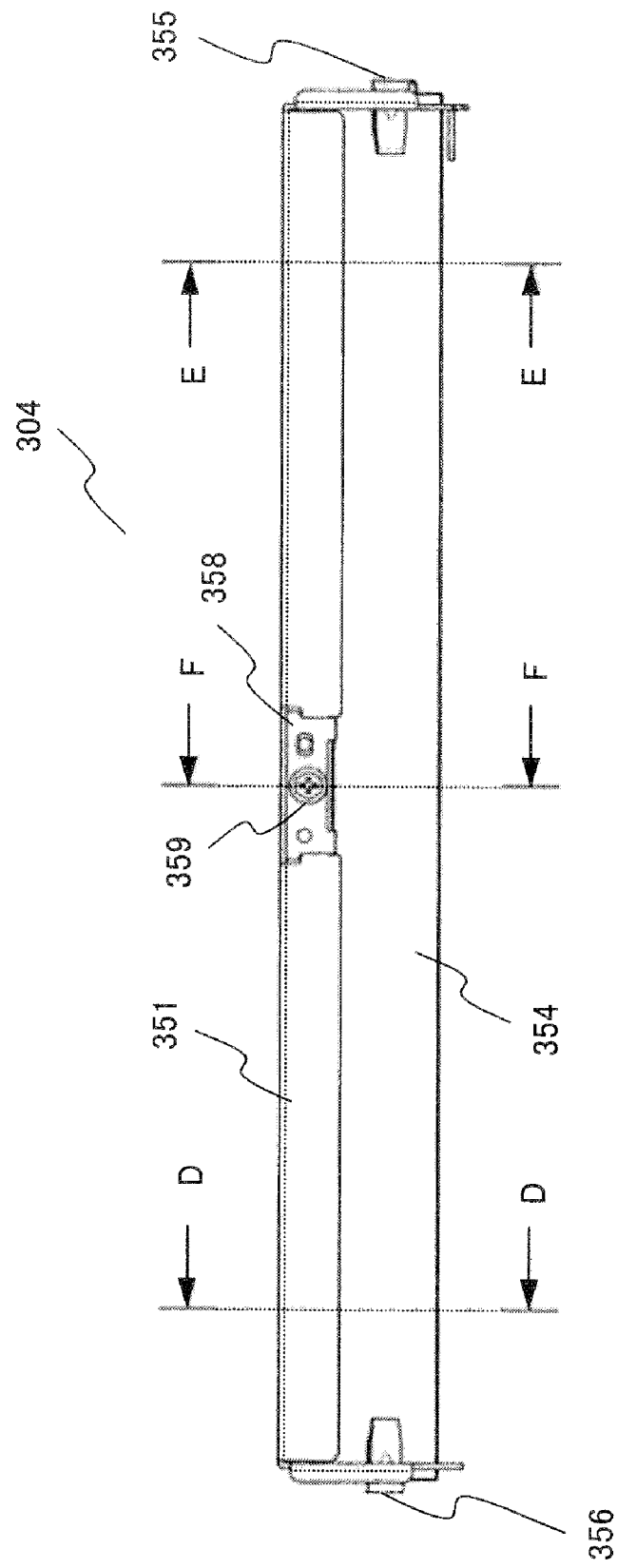
FIG. 18 is a front view of the optical device shown in FIG. 16.
Figure 19:
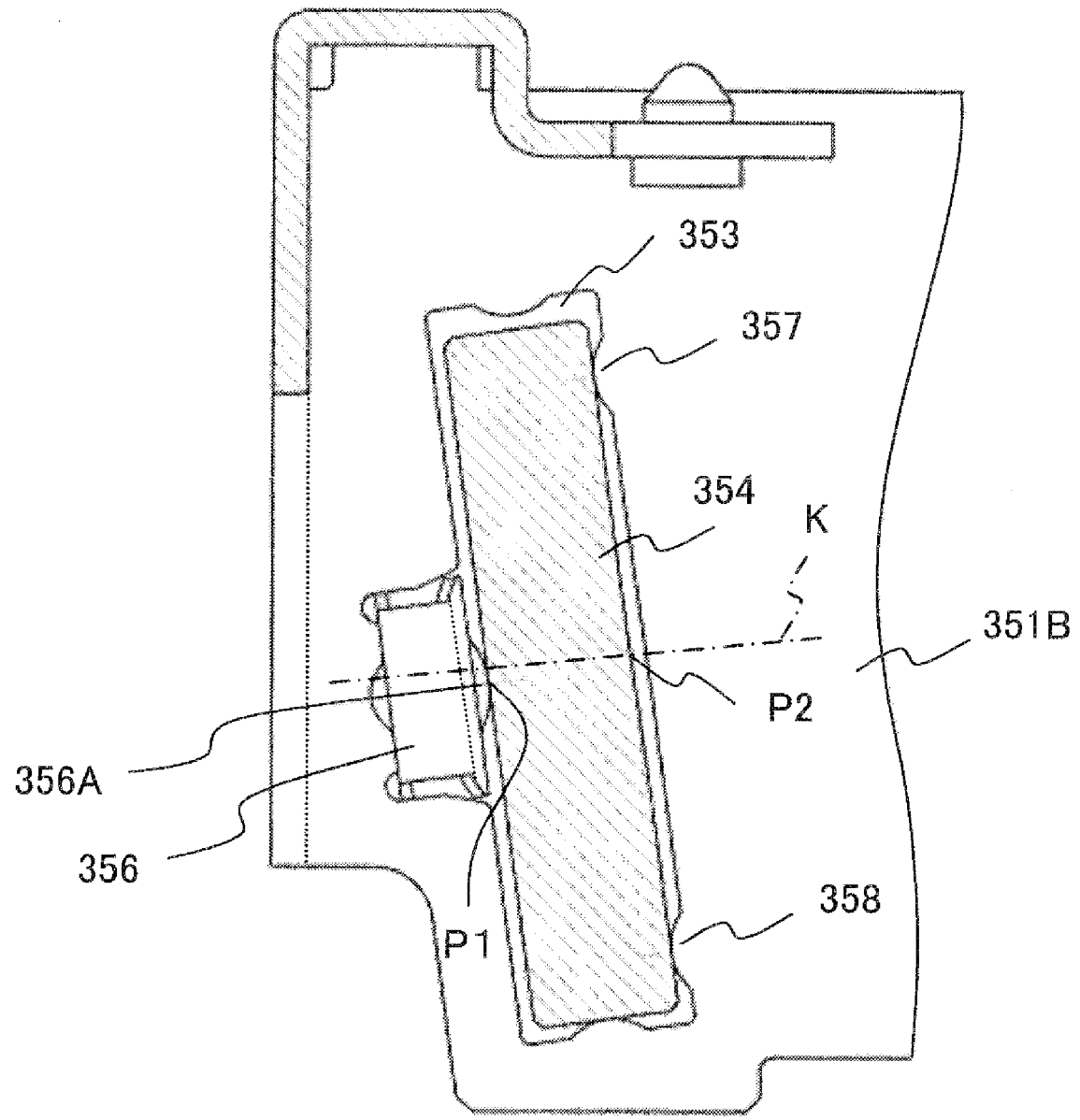
FIG. 19 is a fragmentary cross section in an arrow direction in line D-D of the optical device shown in FIG. 18.
Figure 20:
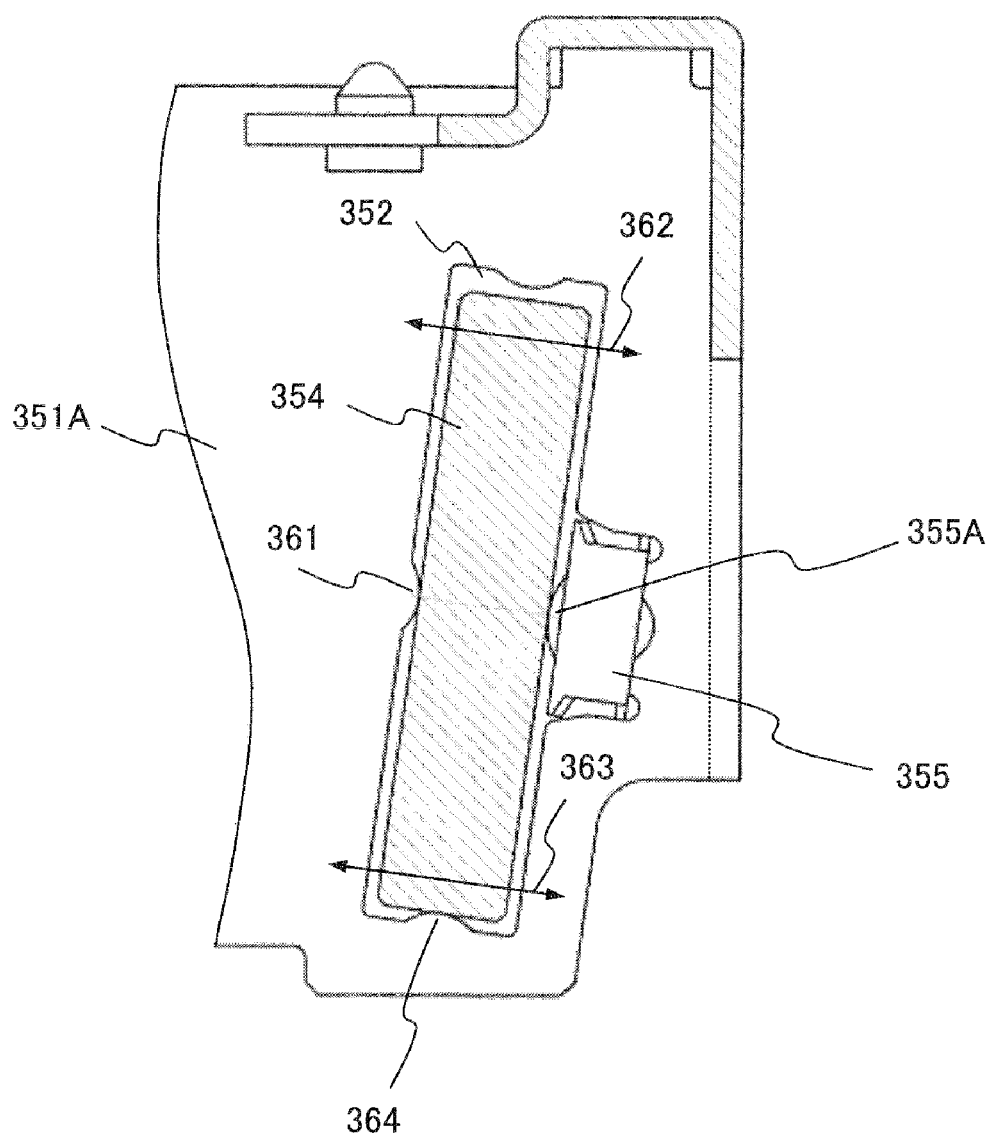
FIG. 20 is a fragmentary cross section in an arrow direction in line E-E of the optical device shown in FIG. 18.
Figure 21:
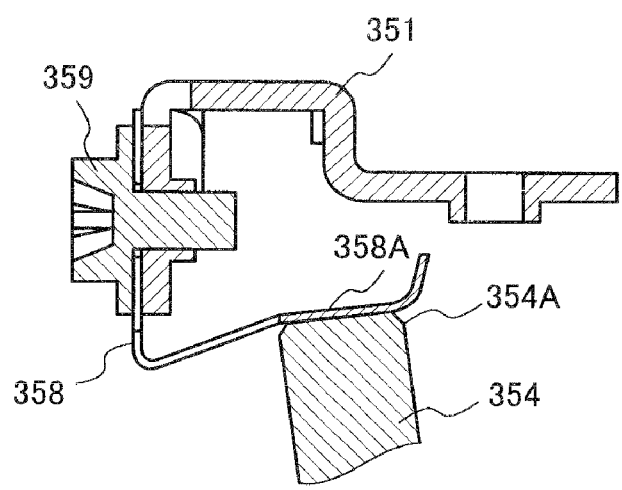
FIG. 21 is a fragmentary cross section in an arrow direction in line F-F of the optical device shown in FIG. 18.

With reference to FIGS. 18-22, a fixing method of the mirror in the optical device of the related art shown in FIG. 16 will be described in detail. FIG. 18 is a front view of the frame 351 of the optical device shown in FIG. 16. FIG. 19, FIG. 20 and FIG. 21 are fragmentary cross sections in the arrow directions taken in the line D-D, E-E and F-F of FIG. 18, respectively.

Hereinafter, position of line D-D, E-E and F-F are described as D1-position (a left side position of the frame 351 seen from the front), E1-position (a right side position of the frame 351 seen from the front) and F1-position (the center position of the frame 351 seen from the front), respectively.

As shown in FIG. 19, in the end on D1-position side, a projecting part 356A of the leaf spring 356 for mirror fixing shown in FIG. 17 is pressing the back of the mirror 354 at one point.

Projecting parts 357 and 358 are formed into two (upper and lower) positions of a fringe of the opening 353 corresponding to a reflecting surface 354A of the mirror 354. As a result, the mirror 354 is sandwiched by total of three points of the projecting part 356A and the projecting parts 357 and 358. That is, in the edge on D1-position side, the mirror 354 is fixed on the optical device 304 by 3 points.

Two of projecting parts 357 and 358 are designed so that the same force may be given to the mirror 354. However, as shown in FIG. 19, there may be a case where a position P1 of the projecting part 356A is not located on straight line K passing through a midpoint P2 of a segment connecting vertexes of two projecting parts 357 and 358.

In this case, unbalance occurs in the force of the projecting parts 357 and 358 that pushes the mirror 354. That is, the force of one of the projecting parts becomes weaker than that of the other projecting part. Then, it becomes easy for vibration to occur in a weaker portion of the force. By this vibration, the optical path of the reflected light fluctuates, and image quality degrades greatly.

As shown in FIG. 20, at the end on E1-position side, a projecting part 355A of a leaf spring 355 for mirror fixing is pressing the back of the mirror 354 at one point. On the other hand, a projecting part 361 is formed into the fringe of the opening 352 corresponding to the reflecting surface 354A of the mirror 354. As a result, the mirror 354 is sandwiched by two points of the projecting part 355A and the projecting part 361. The mirror 354 touches a projecting part 364 of the underside fringe of the opening 352 by its own weight.

In such a state, when the vibration by the friction or the like between the optical device and rails which are not illustrated is transferred to the mirror 354, the mirror 354 vibrates in the direction of an arrow 362 and an arrow 363 with the projecting part 361 being as a fulcrum, because a contact force between the mirror 354 and the projecting part 364 is small. At that time, the amplitude of the mirror 354 becomes large as it is away from the projection part 361. Accordingly, a quality of an image by light reflected at the upper and lower end of the mirror 354 degrades greatly.

Next, as shown in FIG. 21, at F1-position, the damping spring 358 is fixed by the screw 359 on the frame 351 of the optical device. By this damping spring 358, the mirror 354 receives a force in the lower direction in FIG. 21.

Meanwhile, the damping spring 358 presses the central part of the mirror 354. The reason of this is to suppress vibration in the central part of the mirror 354 as it has been described with reference to FIG. 15A and FIG. 15B. In the related art, as shown in FIG. 21, the mirror 354 is held by pressing an operating surface 358A of the damping spring 358 against an upper side face 354A at the central part of the mirror 354.

Figure 22:
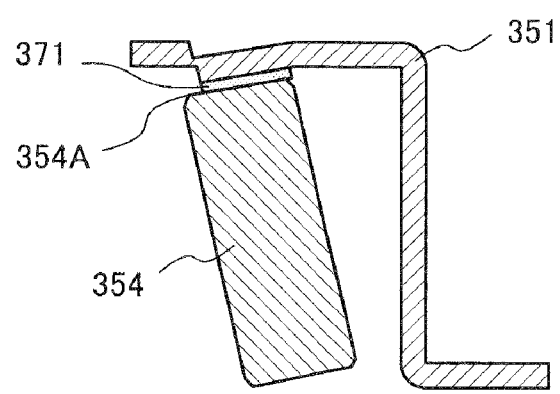
FIG. 22 is a fragmentary cross section of an optical device of related art having a sponge.

FIG. 22 indicates the composition of another related art which may suppress vibration in the central part of the mirror 354. In the composition of FIG. 22, a sponge 371 is arranged between the frame 351 of the optical device and the mirror 354. In this composition, it is difficult for vibration of the frame 351 to be transferred to the mirror 354, because the sponge 371 absorbs vibration. Accordingly, degradation of a quality of an image is suppressed.

Meanwhile, an elastic pushing part is composed of the damping spring 358 and the sponge 371. An elastic member such as a silicon resin which causes volumetric change by elastic deformation is also applicable besides a sponge.

However, an unbalanced force may act between the damping spring 358 and the mirror 354. This unbalanced force becomes a torque which rotates the mirror 354.

Figure 23:
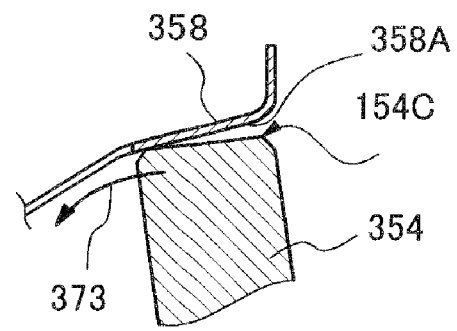
FIG. 23 is a cross section showing a state in which a torque is added to the mirror in the related art shown in FIG. 22.

FIG. 23 is a diagram illustrating the torque which occurs when such unbalanced force acts on the mirror 354. In FIG. 23, the damping spring 358 touches only the left corner (the left corner in FIG. 23) of the upper side face 354A. This contact state is caused by a common difference of a part itself and a common difference when installing it. As a result, the torque in the direction of an arrow 373 acts on the mirror 354.

By the torque in the direction of the arrow 373, the mirror 354 may tilt until the upper side face 354A of the mirror 354 and the operating surface 358A of the damping spring 358 become parallel. When the mirror 354 tilts greatly, an optical path of reflected light from the mirror 354 changes greatly, and thus there may be a case where this reflected light cannot enter the linear image sensor. Accordingly, in an image reading apparatus such as a copying machine, this causes faulty reading of the image.

Figure 24:
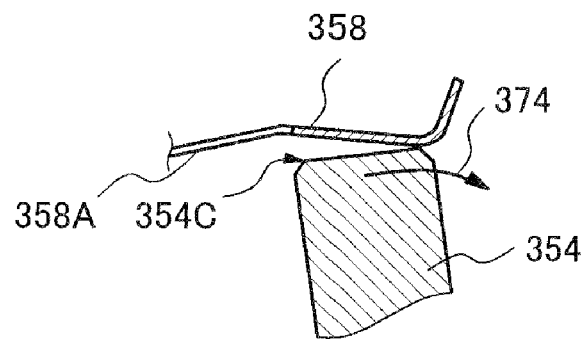
FIG. 24 is a cross section showing a state in which the torque in an opposite direction is added to the mirror in the related art shown in FIG. 22.

FIG. 24 indicates a case where the torque in an opposite direction as the torque shown in FIG. 23 acts on the mirror 354. In this case, the damping spring 358 touches only the right corner (the right corner in FIG. 23) of the upper side face 354A. As a result, the torque in the direction of an arrow 374 acts on the mirror 354. Also in the case of FIG. 24, the reflecting direction of light reflected by the mirror 354 changes greatly and the light may not enter the linear image sensor like the case of FIG. 23. Accordingly, in the image reading apparatus such as the copying machine, it will cause faulty reading of the image.

First Exemplary Embodiment

A first exemplary embodiment of the present invention made based on such consideration will be described.

Figure 1:
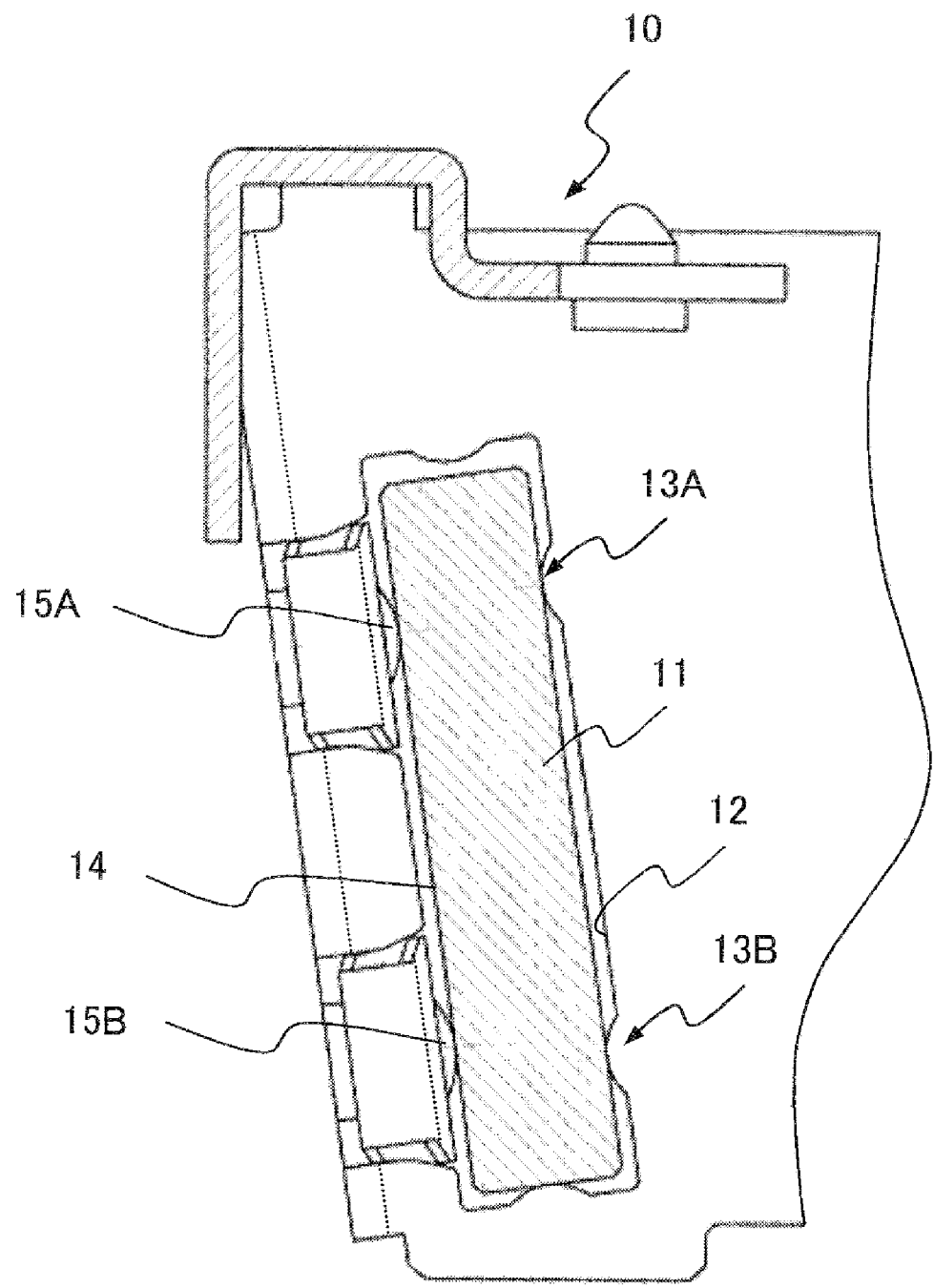
FIG. 1 is a fragmentary cross section of an optical device according to a first exemplary embodiment of the present invention.

FIG. 1 is a cross section in one end area of an optical device according to the first exemplary embodiment. This optical device 10 has a mirror 11 of long length which reflects light. The mirror 11 is arranged in a direction perpendicular to a front and back surfaces of a sheet of FIG. 1 (the main scanning direction, for example).

A face 12 at one of left and right ends of this mirror 11 is being received by a plurality of first receiving parts 13A and 13B. A face 14 opposing the face 12 that the first receiving parts 13A and 13B catch is pushed by a plurality of first pressing parts 15A and 15B that press the mirror 11 with elastic force toward the first receiving parts 13A and 13B.

As a result, the mirror 11 is always pushed hard, and vibration of the mirror 11 by external vibration or the like can be suppressed.

Second Exemplary Embodiment

A second exemplary embodiment of the present invention will be described.

Figure 2:
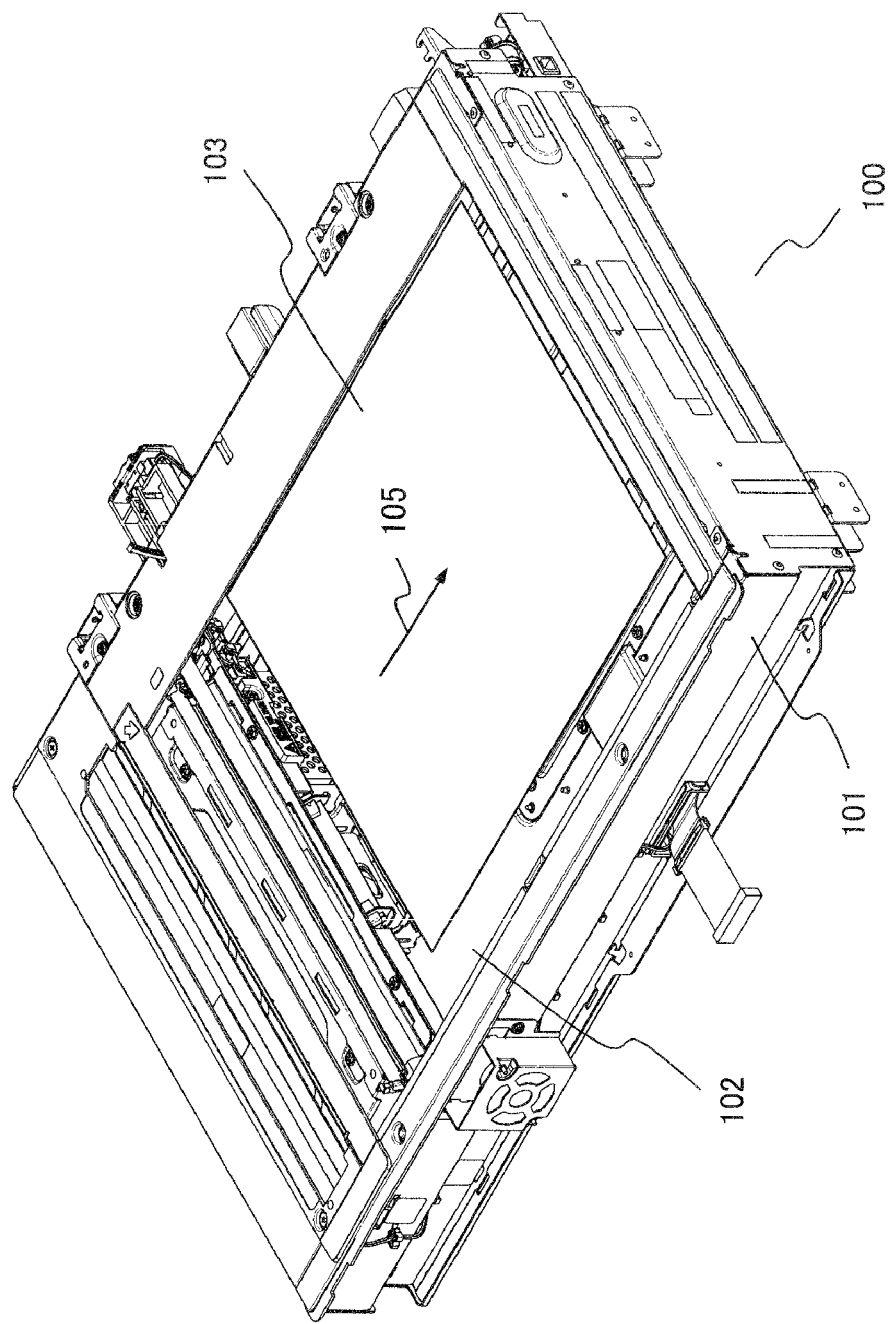
FIG. 2 is a perspective view of an image reading apparatus according to a second exemplary embodiment of the present invention.

FIG. 2 is a perspective view showing main portions of an image reading apparatus having an optical device. Platen glass 102 on which a manuscript 103 is placed is arranged in the upper part of a main-body (chassis) 101 of the image reading apparatus 100. An elongated optical device 104 arranged in a horizontal scanning direction moves to vertical scanning direction 105 and reads image information on the manuscript 103 on a line-by-line basis.

Figure 3:
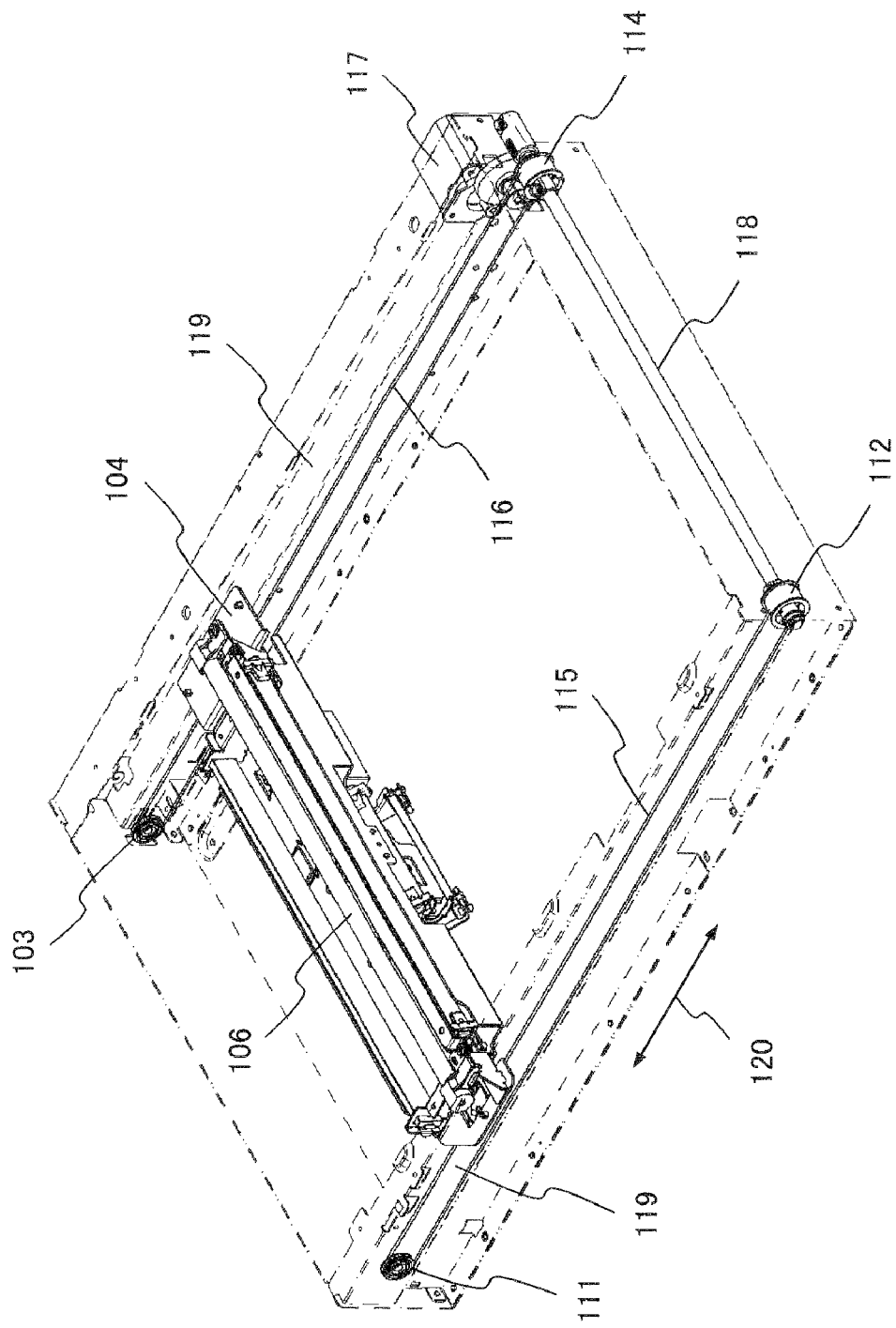
FIG. 3 is a perspective view of an optical device of the image reading apparatus shown in FIG. 2.

FIG. 3 is a perspective view of the optical device in this image reading apparatus. A lamp 106 is mounted on the optical device 104. Drums 111-114 are arranged in the sides of both ends in the vertical scanning direction. Both ends of the optical device 104 are connected to a first wire 115 stretched between the drum 111 and the drum 112 and a second wire 116 stretched between the drum 113 and the drum 114. First and second wires 115, 116 are arranged in parallel in the vertical scanning direction. By a motor 117 rotating, an spindle 118 rotates. Two drums 112 and 114 are connected to this spindle 118. Accordingly, by rotation of the motor 117, the drums 111-114 and the first and second wires 115, 116 revolve in the same direction. The optical device 104 reciprocates in the directions of an arrow 120 on rails 119 with movement of the first wire 115 and the second wire 116. The rails 119 are arranged in parallel with the wire 115, 116, that is, in the vertical scanning direction, and are fixed on a chassis 101 in FIG. 2.

Figure 4:
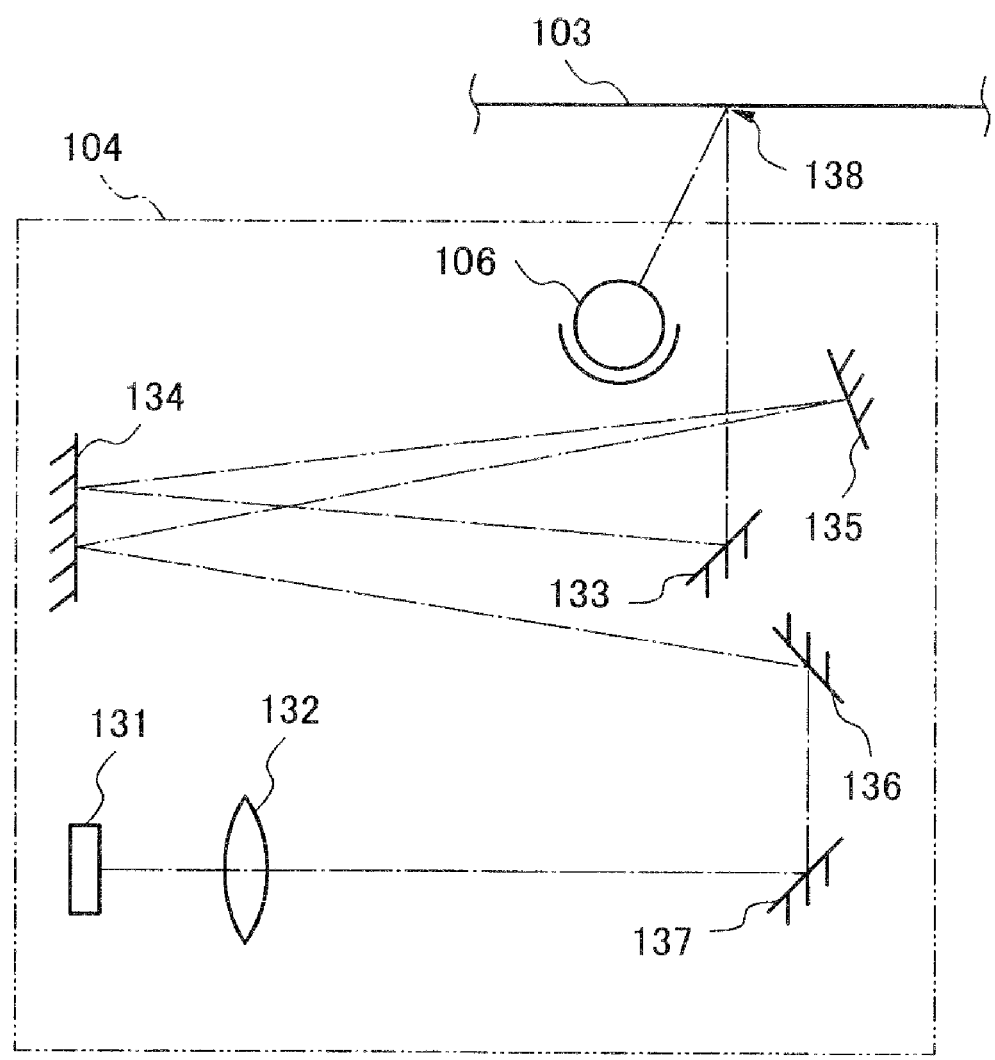
FIG. 4 is a diagram of an optical system in the optical device shown in FIG. 3.

FIG. 4 is a schematic diagram which illustrates an optical system of the optical device 104. The lamp 106 for a light source and a linear image sensor 131 with small size relative to the manuscript 103 are arranged in the optical device 104. For this reason, a distance between an optical lens 132 and the manuscript 103 needs to be set as being long compared with the distance between the optical lens 132 and the linear image sensor 131. Accordingly, mirrors of first to fifth mirrors 133-137 are arranged in the optical device 104.

The optical path length from a reading position 138 of the manuscript 103 to the optical lens 132 is made long by reflecting light a plurality of times. By photoelectrical converting reflected light concentrated by the optical lens 132, the linear image sensor 131 reads the image information.

Figure 5:
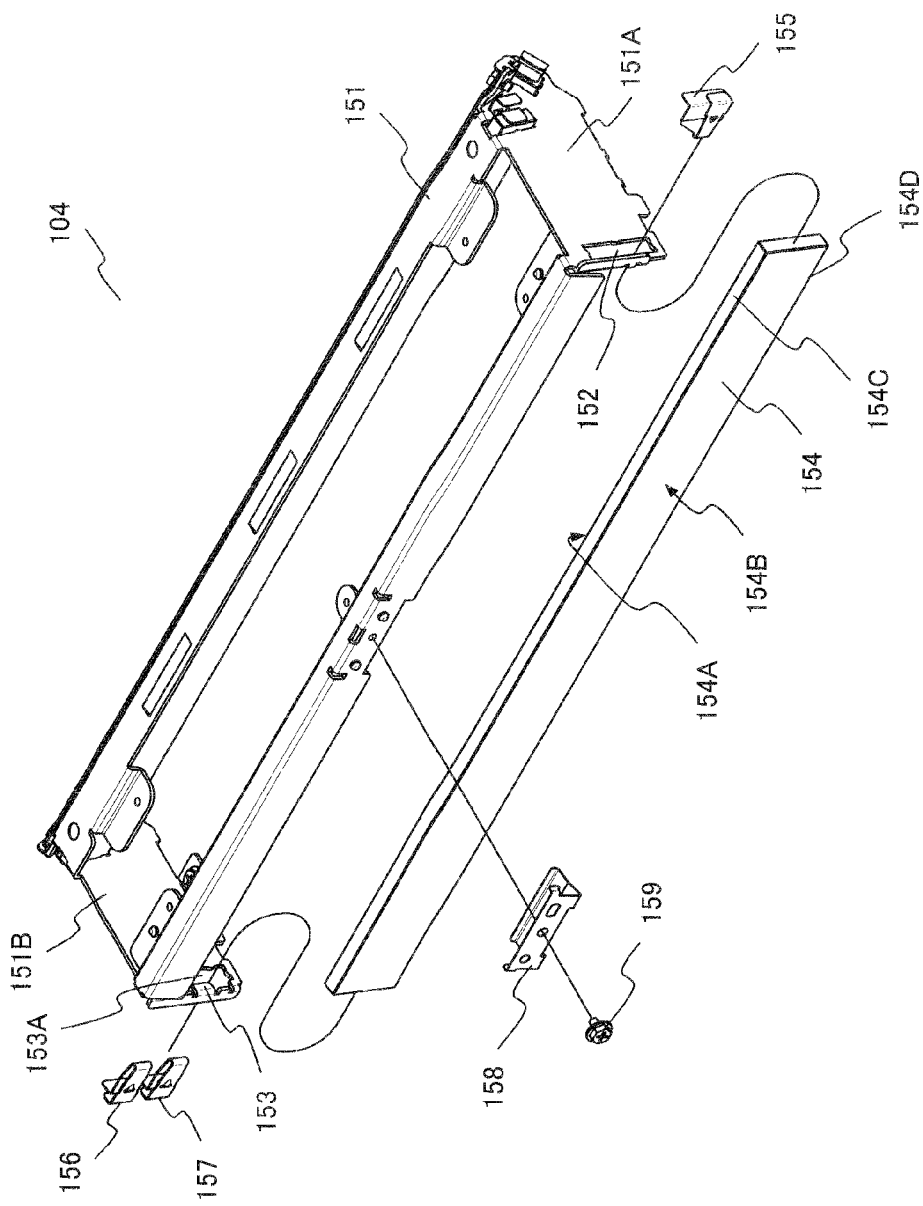
FIG. 5 is an exploded perspective view showing a state in which a mirror is took apart from the optical device.

FIG. 5 is an exploded perspective view showing a state that the mirror is taken apart from the optical device 104. It should be noted that, the optical system in FIG. 5 shows only a mirror 154 while other optical components are omitted. Oblong openings 152 and 153 are formed into both side plates 151A and 151B of a frame 151 of the optical device 104. Although a plurality of mirrors are included in this optical device 104, the mirror 154 installed on the openings 152 and 153 will be described in the following description.

Left and right ends (both ends in horizontal scanning direction) of the mirror 154 are inserted in the opening 152 and the opening 153, respectively. A leaf spring 155 for mirror fixing is inserted between one end of the mirror 154 and the opening 152, and leaf springs 156 and 157 for mirror fixing are inserted between the other end of the mirror 154 and the opening 153. A damping spring 158 is fixed by a screw 159 on a position of the frame 151 corresponding to the central part of the mirror 154. By elastic force of this damping spring 158, the mirror 154 is pressed against the frame 151.

Figure 6:
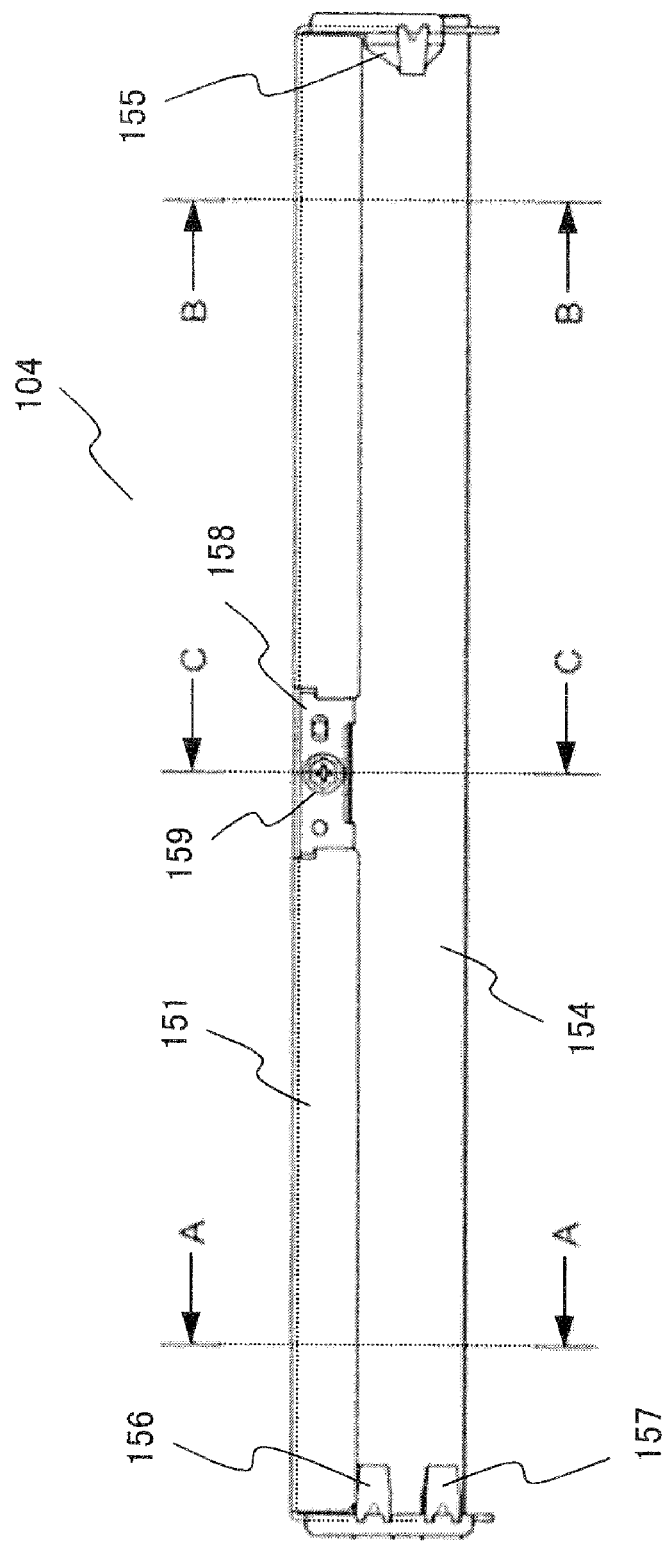
FIG. 6 is a front view of the optical device shown in FIG. 5.

FIG. 6 is a front view of the frame 151 of the optical device 104. A structure in position-A1 (the position of line A-A), position-B1 (the position of line B-B) and position-C1 (the position of line C-C) of this optical device 104 will be described.

Figure 7:
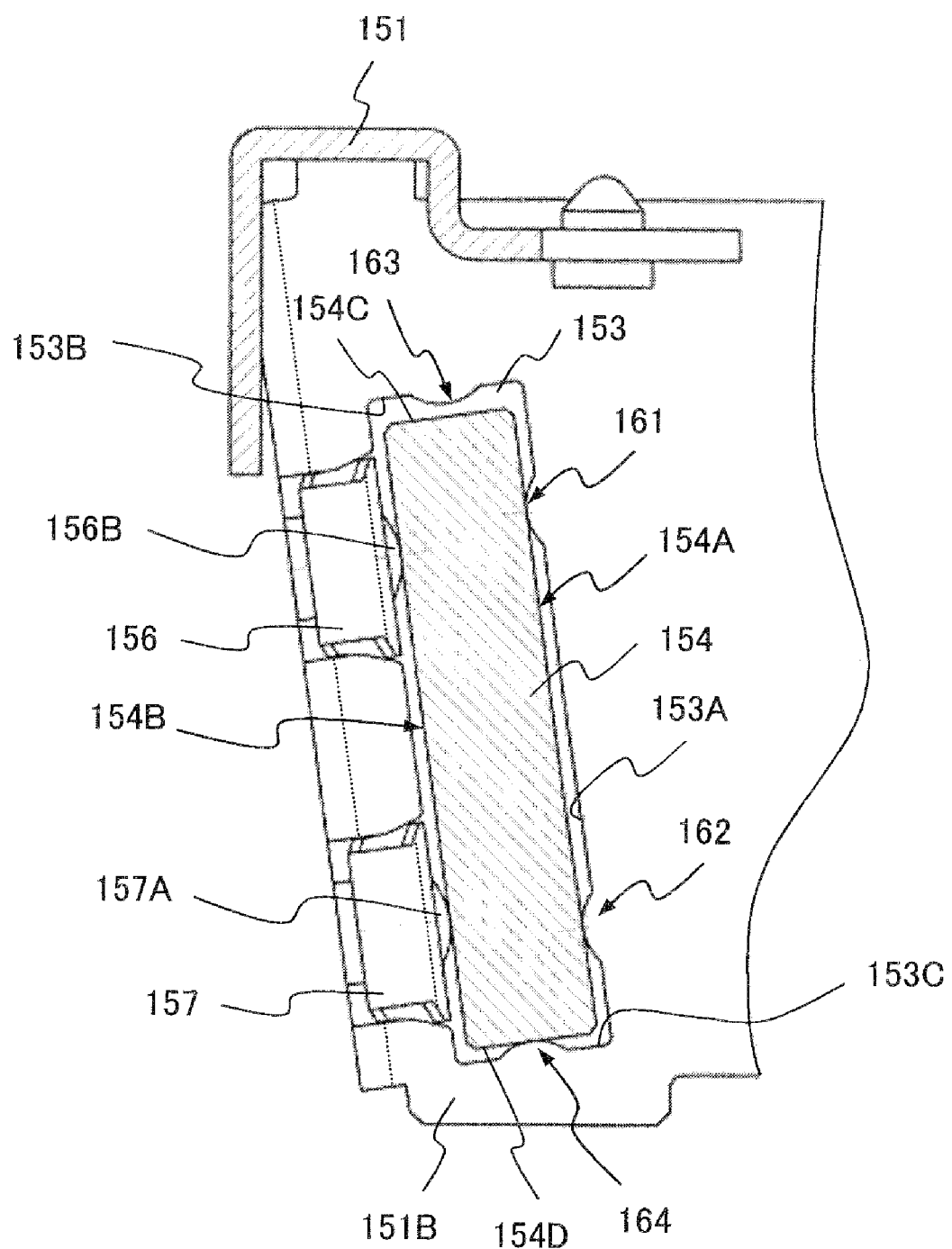
FIG. 7 is a fragmentary cross section in the arrow direction in line A-A of the optical device shown in FIG. 6.

FIG. 7 is a fragmentary cross section in the arrow direction at position-A1 of the optical device shown in FIG. 6. As shown in FIG. 7, first pressing parts 156A and 157A of the leaf springs 156 and 157 for mirror fixing in FIG. 6 make a point contact with a back 154B of the mirror 154 and push it. First receiving parts 161 and 162 are formed at two positions in the vertical direction of a front fringe 153A of the opening 153 facing a reflecting surface 154A of the mirror 154. A projecting part 163 is formed in an upper fringe 153B of the opening 153 to which an upper side 154C of the mirror 154 corresponds, and a supporting part 164 is formed in a lower fringe 153C of the opening 153 to which a lower side 154D of the mirror 154 corresponds.

The lower side 154D of the mirror 154 touches the supporting part 164. Accordingly, the first receiving parts 161 and 162 touches the reflecting surface 154A of the mirror 154, and the first pressing parts 156A and 157A touches the back 154B of the mirror 154. Therefore, at the end in position-A1 side of the mirror 154, it is sandwiched by total of 4 points: the first pressing parts 156A and 157A, and the first receiving parts 161 and 162.

Figure 8:
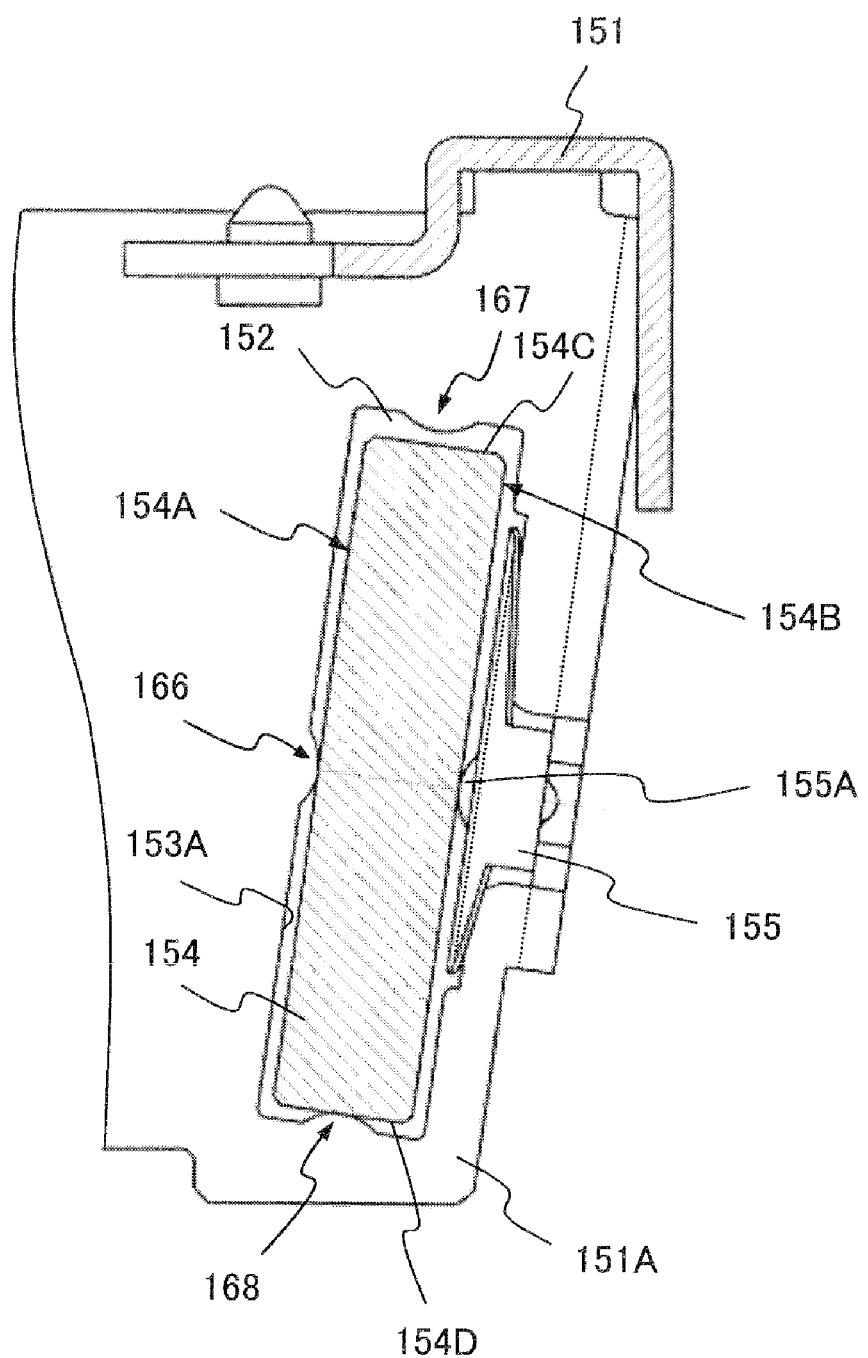
FIG. 8 is a fragmentary cross section in the arrow direction in line B-B of the optical device shown in FIG. 6.

FIG. 8 is a fragmentary cross section in an arrow direction in position-B1 of the optical device shown in FIG. 6. In the end on position-B1 side, a second pressing part 155A of the leaf spring 155 for mirror fixing shown in FIG. 6 makes a point contact with the back 154B of the mirror 154 and pushes it. A second receiving part 166 is formed on the front fringe 152A of the opening 152 facing the reflecting surface 154A of the mirror 154. This second receiving part 166 is opposite to the second pressing part 155A.

A projecting part 167 and a supporting part 168 are formed on the top and bottom fringes of the opening 152 corresponding to the upper side 154C and the lower side 154D of the mirror 154, respectively. The lower side 154D of the mirror 15 touches the supporting part 168.

The back 154B of the mirror 154 touches the second pressing part 155A, and the reflecting surface 154A touches the second receiving part 166, and the mirror 154 is sandwiched by these second pressing part 155A and second receiving part 166.

Meanwhile, slight unevenness such as a burr may exist on the surface of the supporting parts 164 and 168, because the openings 152, 153 are formed by sheet metal processing. When such unevenness exists, a friction resistance between the lower side 154D of the mirror 154 and the supporting parts 164, 168 becomes large, and the following inconvenience will arise.

A case where the mirror 154 is sandwiched by the second pressing part 155A and the second receiving part 166 is considered. In this case, the mirror 154 is pushed by the second pressing part 155A and moves toward the second receiving part 166, and is stopped at a position where this pressing force and the friction resistance force balance. In such a contact state, when vibration is added to the mirror 154, a position of the mirror 154 shifts easily, and an optical path of reflected light changes significantly. In this case, it is preferable to make the friction resistance between the lower side 154D of the mirror 154 and the supporting parts 164, 168 small by applying a lubricant between the lower side 154D of the mirror 154 and the supporting parts 164, 168.

Figure 9:
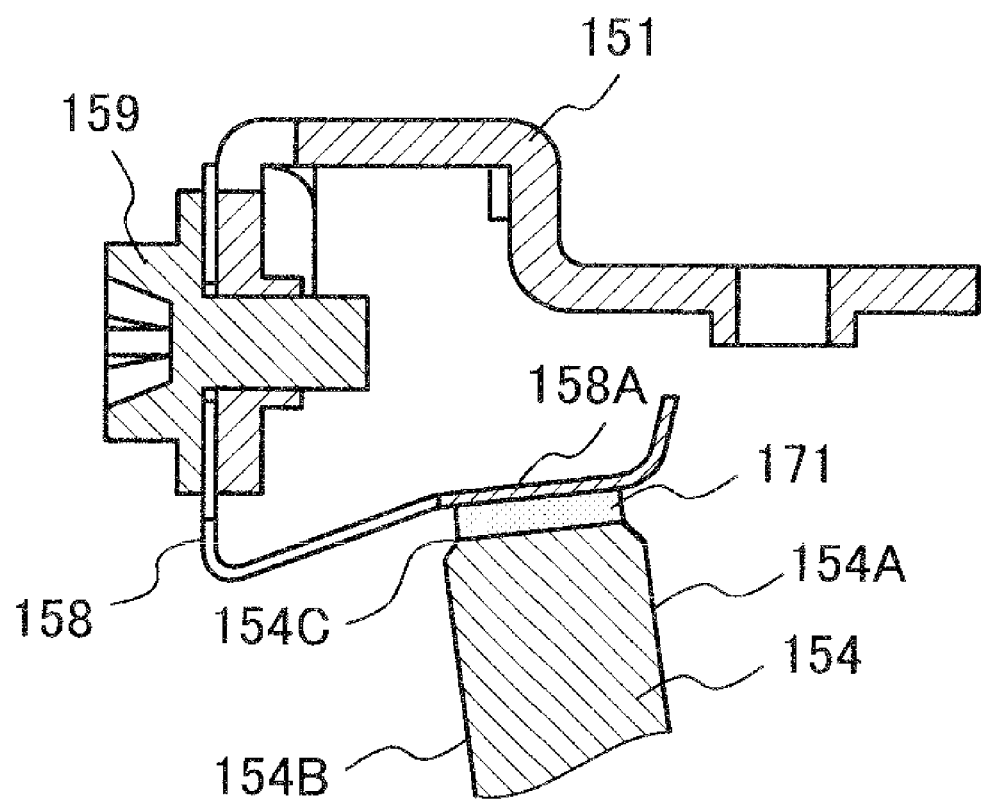
FIG. 9 is a fragmentary cross section in the arrow direction in line C-C of the optical device shown in FIG. 6.

FIG. 9 is a fragmentary cross section in an arrow direction at position-C1 of the optical device shown in FIG. 6. At position-C1, the damping spring 158 is fixed on a central part of the frame 151 of the optical device by the screw 159. A sponge 171 is arranged between the damping spring 158 and the upper side 154C of the mirror 154, and the damping spring 158 pushes the mirror 154 through the sponge 171.

In this exemplary embodiment, the sponge 171 is a plate-like member having a size in the direction from the mirror 154 to the damping spring 158 of 1.5 mm, a size in the thickness wise direction of the mirror 154 of 4 mm and a size in the lengthwise direction of the mirror 154 of 30 mm.

The sponge 171 is fixed on an operating surface 158A of the damping spring 158 and the upper side 154C of the mirror 154 by a double-stick tape or an adhesive or the like.

Figure 10:
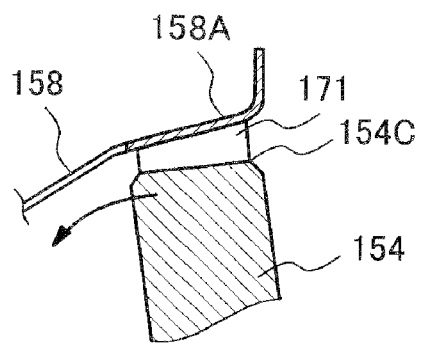
FIG. 10 is a fragmentary cross section of the optical device which indicates a deformed state of a sponge.
Figure 11:
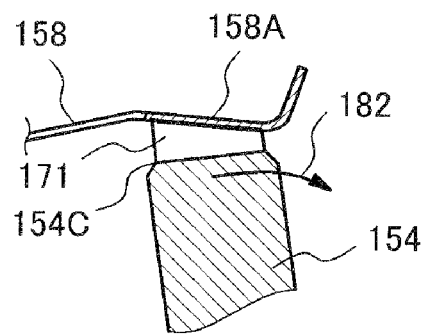
FIG. 11 is a fragmentary cross section of the optical device which indicates another deformed state of the sponge.

FIG. 10 and FIG. 11 are diagrams showing a deformed state of the sponge 171 arranged between the damping spring 158 and the mirror 154. The upper side 154C of the mirror 154 and the operating surface 158A of the damping spring 158 may not be parallel because of part tolerance of the opening 153 and the mirror 154 and installation tolerance of the mirror 154. However, a value of a torque which works on the mirror 154 is suppressed, because the sponge 171 transforms according to the shape of a space formed by the upper side 154C of the mirror 154 and the operating surface 158A of the damping spring 158.

That is, when a space between the upper side 154C and the operating surface 158A in a right side is larger than that of a left side as shown in FIG. 10, a torque in the direction of an arrow 181 acts on the mirror 154. Also, a torque in the direction of an arrow 182 acts on the mirror 154, when a space between the upper side 154C and the operating surface 158A in the right side is smaller than that of the left side as shown in FIG. 11.

At that time, by the sponge 171 being transformed, the force of the damping spring 158 becomes to be added to the upper side 154C of the mirror 154 almost vertically. When the upper side 154C of the mirror 154 and the operating surface 158A of the damping spring 158 are not parallel, elastic force of the damping spring 158 becomes to have an component of force that pushes the mirror 154 toward the supporting parts 164, 168 side (refer to FIG. 7 and FIG. 8) and an component of force that works to rotate the mirror 154.

In such a state, when the sponge 171 is arranged between the upper side 154C and the operating surface 158A, the sponge 171 is transformed into a trapezoidal shape as shown in FIG. 10 and FIG. 11. The force that works to rotate the mirror 154 is mitigated in the sponge 171. As a result, the force that works to rotate the mirror 154 becomes small, and the force of the damping spring 158 becomes to act on the upper side 154C almost vertically. Accordingly, by using the sponge 171, the torque added to the mirror 154 can be made small.

Figure 12:
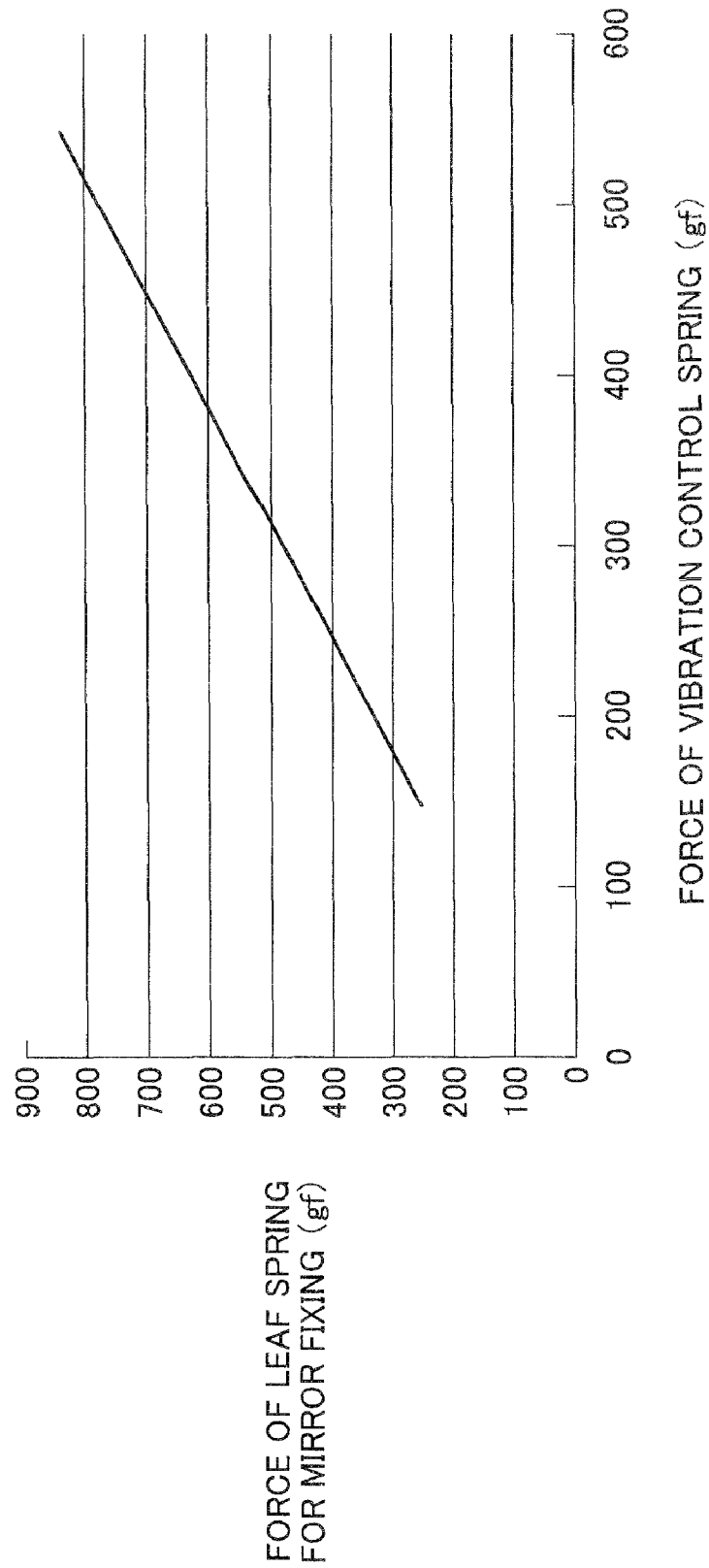
FIG. 12 is a characteristics diagram showing relation between a force of a leaf spring for fixing the mirror and a force of a damping spring.

FIG. 12 is a diagram showing relation between the force of the leaf spring 155 for mirror fixing shown in FIG. 8 and the force of the damping spring 158 shown in FIG. 9. As stated above, by using the sponge 171, it can be assumed that the force which works between the lower side 154D of the mirror 154 and the supporting part 168 is approximately equal to the force of the damping spring 158, because most force of the damping spring 158 acts on the upper side 154C almost vertically.

Meanwhile, because the mirror 154 is sandwiched by the leaf spring 155 for mirror fixing and the second receiving part 166, a frictional force is working between them. Accordingly, force working between the lower side 154D of the mirror 154 and the supporting part 168 comes from difference between the force of the damping spring 158 and the frictional force.

When the force of the leaf spring 155 for mirror fixing is relatively weak (that is, when the frictional force is small), the lower side 154D of the mirror 154 can be made touch certainly on the supporting part 168 even if the force of the damping spring 158 is weak. On the other hand, when the leaf spring 155 for mirror fixing is strong (that is, when the frictional force is large), the lower side 154D of the mirror 154 cannot be made touch certainly on the supporting part 168 unless the force of the damping spring 158 is made strong. In order to suppress vibration of the mirror 154, it is required that the lower side 154D of the mirror 154 touches the supporting part 168 certainly.

Accordingly, in this exemplary embodiment, the force of the damping spring 158 and the force of the leaf spring 155 for mirror fixing are set so that proportional relation shown in FIG. 12 may be satisfied. FIG. 12 shows that the force of the damping spring 158 is also made strong when the force of the leaf spring 155 for mirror fixing is strong, and the force of the damping spring 158 is also made weak when the force of the leaf spring 155 for mirror fixing is weak. As a result, vibration of the mirror 154 can be suppressed substantially.

Meanwhile, the end in position-A1 side of the mirror 154 shown in FIG. 7 is held by the first receiving parts 161 and 162, the first pressing parts 156A and 157A and the supporting part 164. At that time, the first pressing part 156A and the first pressing part 157A are located between the first receiving part 161 and the first receiving part 162 sandwiching the mirror 154. When only one of the first receiving part 161 and the first receiving part 162 is located between the first pressing part 156A and the first pressing part 157A, a torque in the direction parallel to the sheet of FIG. 7 occurs. Accordingly, occurrence of this torque is being prevented by arranging the first pressing part 156A and the first pressing part 157A between the first receiving part 161 and the first receiving part 162. Of course, the first receiving part 161 and the first receiving part 162 may be located between the first pressing part 156A and the first pressing part 157A.

The end of the mirror 154 in position-B1 side shown in FIG. 8 is held by a composition different from that of the end in the position-A1 side. A reason is as follows. That is, the position of the end in position-A1 side is specified by the first receiving parts 161 and 162, the first pressing parts 156A and 157A and the supporting part 164. When the position of the end in position-B1 side is specified by the same composition as that of the end in position-A1 side, each of the end in position-A1 side and the end in position-B1 side will be positioned independently. At that time, the end in position-A1 side and the end in position-B1 side need to be positioned properly so that a twist does not occur in the longitudinal direction of the mirror 154. It is very difficult to position the end in position-A1 side and the end in position-B1 side properly.

Therefore, the end in position-B1 side is held such that the mirror 154 is only pinched by the second pressing part 155A and the second receiving part 166. By this, the position of the mirror 154 is decided at the end in position-A1 side, and the end in position-B1 side is just sandwiched while keeping the positioned state. As a result, vibration of the mirror 154 can be suppressed substantially.

Figure 13:
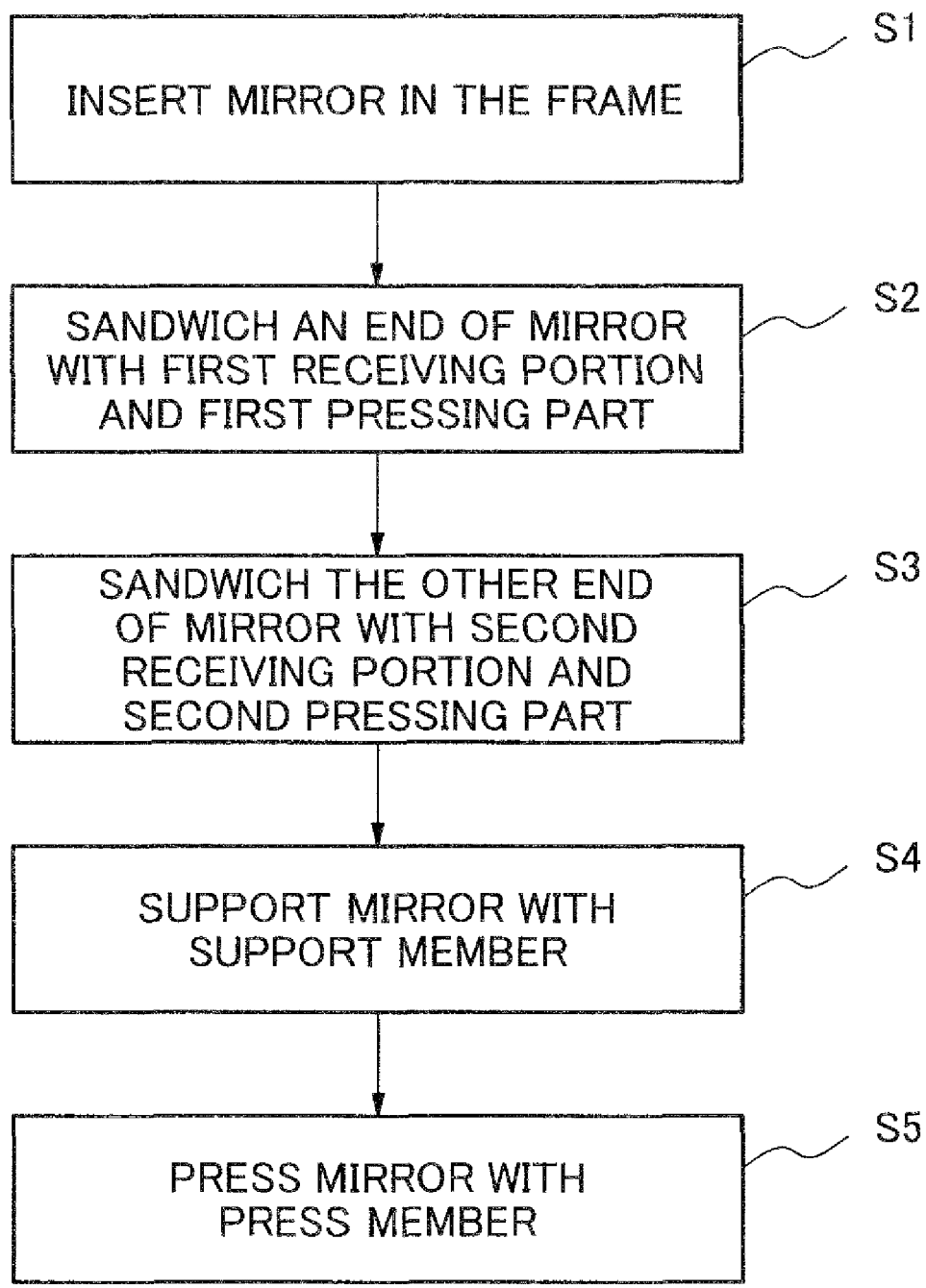
FIG. 13 is a flowchart showing an assembly procedure of the optical device.

Fixing of the mirror 154 in such the optical device is performed by a procedure shown in FIG. 13. Refer to FIGS. 7 to 9 about the reference numbers of the respective members.

First, both ends of the mirror 154 are inserted in the openings 152 and 153 formed into the two side plates 151A and 151B of the frame 151 (Step S1).

Next, the leaf springs 156 and 157 for mirror fixing is inserted between the mirror 154 and the opening 153. As a result, one end of the mirror 154 is sandwiched by the first pressing parts 156A and 157A of the leaf springs 156 and 157 for mirror fixing and the first receiving parts 161 and 162 (Step S2).

After that, the leaf spring 155 for mirror fixing is inserted between the mirror 154 and the opening 152. As a result, the other end of the mirror 154 is sandwiched by the second pressing part 155A of the leaf spring 155 for mirror fixing and the second receiving part 166 (Step S3).

In this state, there may be a case that the lower side 154D of the mirror 154 does not touch the supporting parts 164 and 168. Accordingly, the mirror 154 is pushed down to make the lower side 154D have contact with the supporting parts 164 and 168 (Step S4).

Finally, the mirror 154 is pressed toward supporting parts 164 and 168 side by the damping spring 158 via the sponge 171 (Step S5).

At that time, the force of the damping spring 158 and the force of the leaf spring 155 for mirror fixing is adjusted such that there will be proportional relation as shown in FIG. 12. For example, a plurality of leaf springs 155 for mirror fixing with various levels of elastic force are prepared, and adjustment is made so that power relationships between the force of the damping spring 158 and the force of the leaf spring 155 for mirror fixing may satisfy proportional relation. Also, by adjusting the curving degree of the damping spring 158 shown in FIG. 9 appropriately, it is set as power relationships of the both forces are in proportional relation.

The image reading apparatus 100 formed in this way operates as follows. First, the manuscript 103 is placed on the platen glass 102 shown in FIG. 2 and reading of an image is directed from an operating panel or an information processing apparatus which is not illustrated. As a result, the lamp 106 shown in FIG. 3 lights up and the optical device 104 begins movement in the direction of the vertical scanning direction 105 shown in FIG. 2 from a scan starting position, and reading of the image is begun. At that time, vibration which occurs when the optical device 104 moves on the rails 119 is transferred to the optical device 104.

As shown in FIG. 8, the end of the mirror 154 in position-B1 side installed in the optical device 104 of the image reading apparatus 100 of this exemplary embodiment is pushed by the leaf spring 155 for mirror fixing toward the second receiving part 166 side. The lower side 154D of the mirror 154 touches the supporting part 168 on the bottom end side of the opening 152. The force of the lowers side 154D of the mirror 154 to this supporting part 168 has been conditioned by installing the sponge 171 between the damping spring 158 and the mirror 154. By this force, vibration in position-B1 of the mirror 154 is suppressed.

At the end on position-A1 side shown in FIG. 7, the mirror 154 is held by the leaf spring 156 for mirror fixing, the leaf spring 157 for mirror fixing and the first receiving parts 161 and 162. As a result, vibration of the mirror 154 generated by unbalance of holding force is suppressed.

Moreover, at a central position of the mirror 154, the damping spring 158 is pushing the upper side 154C of the mirror 154 via the sponge 171 as shown in FIG. 9. As a result, vibration of the mirror 154 while curving is prevented.

In addition, in the image reading apparatus 100 having support structure of the mirror 154 shown in FIG. 8, it is preferable that the force by the leaf spring 155 for mirror fixing and the force of the damping spring 158 are in proportional relation as shown in FIG. 12.

By the above, a color deviation, a jitter and an image fluctuation when reading an image can be prevented, because vibration of the mirror 154 is prevented effectively by the image reading apparatus 100 of this exemplary embodiment. Accordingly, high-definition image information can be provided. Furthermore, the image reading apparatus which is not constrained by such as the number of mirrors, the length and the thickness of the mirror can be composed, because vibration of each mirror of which the optical system is composed can be prevented. Accordingly, a degree of design freedom of the image reading apparatus increases. In contrast to a configuration in which light is reflected using a midsection of the mirror where vibration is small, light can be reflected also at a peripheral part of the mirror. Accordingly, the degree of design freedom of the image reading apparatus increases and miniaturization of the image reading apparatus can be realized.

In the image reading apparatus 100 of the second exemplary embodiment, the sponge 171 contacts with the damping spring 158 and a side of the mirror 154, as shown in FIG. 9. As a result, an uniform pressure can be applied to the overall surface of the upper side 154C of the mirror 154, even when the operating surface 158A of the damping spring 158 is not parallel to the surface of the upper side 154C of the mirror 154. Accordingly, a situation where the damping spring 158 pushes the mirror disproportionately as shown in FIG. 23 and FIG. 24 can be prevented.

Third Exemplary Embodiment

Figure 14:
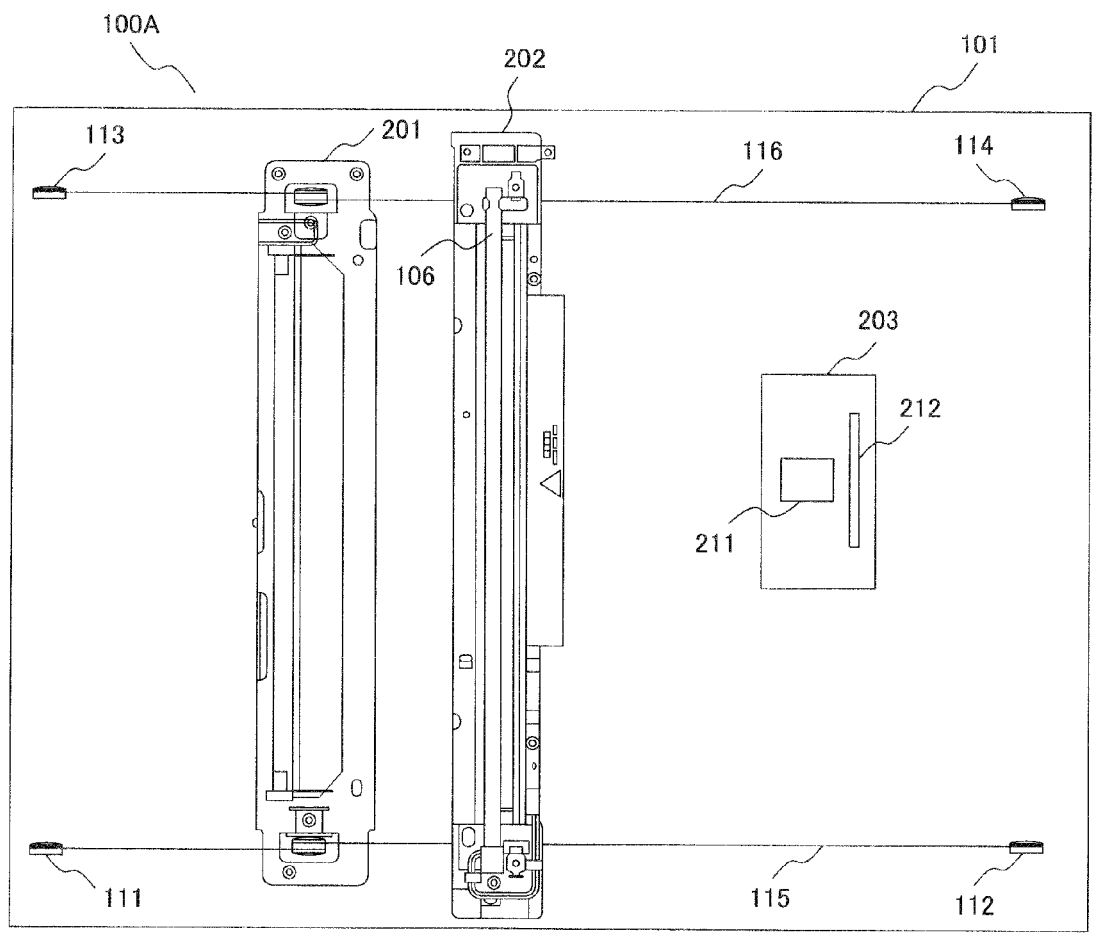
FIG. 14 is a top view of an image reading apparatus according to a third exemplary embodiment of the present invention.

Next, a third exemplary embodiment of the present invention will be described. FIG. 14 is a top view showing main portions of an optical system in an image reading apparatus according to the third exemplary embodiment of the present invention. In addition, in FIG. 14, the same numerals are given about the same elements in FIG. 3, and description thereof will be omitted appropriately.

In this image reading apparatus 100A, the optical device 104 (FIG. 3) described in the previous exemplary embodiment includes first and second movable units 201 and 202 and a fixed unit 203. The second movable unit 202 includes the lamp 106 and a plurality of mirrors (not shown) to refract or reflect light reflected from a manuscript (not shown). The second movable unit 202 travels on vertical scanning positions of the manuscript in a uniform velocity progressively.

The fixed unit 203 includes an optical lens 211 and a linear image sensor 212, and is fixed on a predetermined position. The first movable unit 201 is a module which moves in the direction of the vertical scanning keeping predetermined relation with the second movable unit 202. That is, the first movable unit 201 moves such that, for the fixed unit 203 arranged in a fixed position, distance from a reading position of a manuscript to the optical lens 211 may be always equal.

Also in the image reading apparatus 100A as shown in FIG. 14, the first and second movable units 201 and 202 are equipped with the mirror. Even if vibration by movement of the first and second movable units 201 and 202 is transferred to the mirrors, vibration of the mirrors can be suppressed according to the same principle as the previous exemplary embodiment.

Other Exemplary Embodiment

Next, a fourth exemplary embodiment of the present invention will be described. According to the fourth exemplary embodiment of the present invention, an optical device includes: a mirror of long length of which a part of an optical system which forms an image is composed; a mirror end holding means which sandwiches this mirror at one point which is a central position in the short side direction of the mirror on a reflecting surface of the mirror and on the back face thereof in at least one end among both ends of the mirror; and a mirror side force means which pushes one side of the mirror elastically at the intermediate position in the long side direction of the mirror on a reflecting surface of the mirror and the back surface thereof.

Also, an image reading apparatus according to an exemplary embodiment of the present invention includes: a platen on which a manuscript which is an object of image reading is placed; an optical device arranged under this platen so that it is capable of reciprocating in the vertical scanning direction; and a vertical scanning direction traveling means which moves the optical device toward the vertical scanning direction when reading the manuscript.

Moreover, an adjusting method for an optical device according to an exemplary embodiment of the present invention includes: a mirror end holding step for sandwiching a mirror of long length, of which a part of an optical system which forms an image is composed, at one point which is a central position in the short side direction of the mirror on a reflecting surface of the mirror and on the back surface thereof in at least one end among both ends of the mirror; an optical device adjustment step in which, when one side of the mirror is pushed at the intermediate position in the long side direction of the mirror on a reflecting surface of the mirror and on the back surface thereof, adjustment is made so that a force pushing the mirror may be proportional with a pressure when sandwiching the mirror in the mirror end holding step.

As a result, vibration in an end of a mirror can be suppressed and also occurrence of bow-shaped vibration at the intermediate position can also be suppressed effectively, because the mirror is pushed elastically at the intermediate position of the mirror. Accordingly, vibration of a mirror can be suppressed effectively with an easy configuration.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. Further, it is the inventor's intention to retain all equivalents of the claimed invention even if the claims are amended during prosecution.

What is claimed is:

1. An optical device equipped with a mirror which reflects light, comprising:
    a plurality of first receiving parts that touch one face in one end in a lengthwise direction of said mirror; and
    a plurality of first pressing parts that touch a face opposing to said face to which said first receiving parts touch, and press said mirror with elastic force toward said first receiving parts, wherein
    two among said first receiving parts and two among said first pressing parts are set up separately each other respectively, and said two first pressing parts are installed such that they are located between said two first receiving parts sandwiching said mirror.

2. An optical device according to claim 1, further comprising:
    one second receiving part that touches one face in an other end of said mirror; and
    one second pressing part that touches a face opposing to said face to which said second receiving part touches, and presses said mirror with elastic force toward said second receiving part.

3. An optical device according to claim 2, further comprising:
    a supporting part which supports a face of said mirror on which own weight of said mirror acts.

4. An optical device according to claim 3, wherein
    a contact zone of said supporting part and said mirror is lubricated by a lubricant.

5. An optical device according to claim 1, wherein
    said two first receiving parts are installed such that they are located between said two first pressing parts sandwiching said mirror.

6. An optical device according to claim 3, further comprising:
    an elastic pushing part which presses said mirror with elastic force in a direction toward said supporting part.

7. An optical device according to claim 6, wherein
    said elastic pushing part comprises: a spring member which pushes said mirror; and an elastic member installed between said spring member and said mirror.

8. An optical device according to claim 6, wherein
    a force which said second pressing part pushes said mirror toward said second receiving part and a force which said elastic pushing part pushes said mirror toward said supporting part are in proportional relation.

9. An adjusting method for an optical device equipped with a mirror which reflects light, comprising:
- a procedure for sandwiching one of ends in a lengthwise direction of said mirror with a plurality of first receiving parts and a plurality of first pressing parts;
- a procedure for sandwiching an other end of said mirror with one second receiving part and one second pressing part;
- a procedure for supporting a face of said mirror on which own weight of said mirror acts; and
- a procedure for pressing said mirror in a direction toward said supporting part, wherein
- two among said first receiving parts and two among said first pressing parts are set up separately each other respectively, and said two first pressing parts are installed such that they are located between said two first receiving parts sandwiching said mirror, and
- one of a force which said second pressing part pushes said mirror toward said second receiving part and a force which said elastic pushing part pushes said mirror toward said supporting part is adjusted such that they are in proportional relation.

10. An optical device equipped with a mirror which reflects light, comprising:
- a plurality of first receiving means for receiving one face of one of ends in a lengthwise direction of said mirror; and
- a plurality of first pressing means for touching a face opposing to said face to which said first receiving means touch, and pressing said mirror with elastic force toward said first receiving means, wherein
- two among said first receiving means and two among said first pressing means are set up separately each other respectively, and said two first pressing means are installed such that they are located between said two first receiving means sandwiching said mirror.

11. An optical device according to claim 10, further comprising:
- one second receiving means for receiving one face in an other end of said mirror; and
- one second pressing means for touching a face opposing to said face to which said second receiving means touches, and presses said mirror with elastic force toward said second receiving means.

12. An optical device according to claim 11, further comprising:
- a supporting part means for supporting a face of said mirror on which own weight of said mirror acts.

13. An image reading apparatus which reads image information on a manuscript, comprising:
- a platen on which said manuscript is placed;
- an optical device having a plurality of first receiving parts that touch one face of one of left and right ends in a lengthwise direction of said mirror, and a plurality of first pressing parts that touch a face opposing to said face to which said first receiving parts touch, and press said mirror with elastic force toward said first receiving parts; and
- an optical device moving mechanism which moves said optical device in a predetermined direction when reading said manuscript, wherein
- two among said first receiving parts and two among said first pressing parts are set up separately each other respectively, and said two first pressing parts are installed such that they are located between said two first receiving parts sandwiching said mirror.

14. An image reading apparatus which reads image information on a manuscript according to claim 13, wherein
- said optical device comprises: one second receiving part which touches one face in an other end of said mirror; and
- a second pressing part that touches a face opposing to said face to which said second receiving part touches, and presses said mirror with elastic force toward said second receiving part.

* * * * *